Nov. 10, 1931.          M. DOVIDAITES          1,831,527
                        CREAM RECEPTACLE
                        Filed May 28, 1929
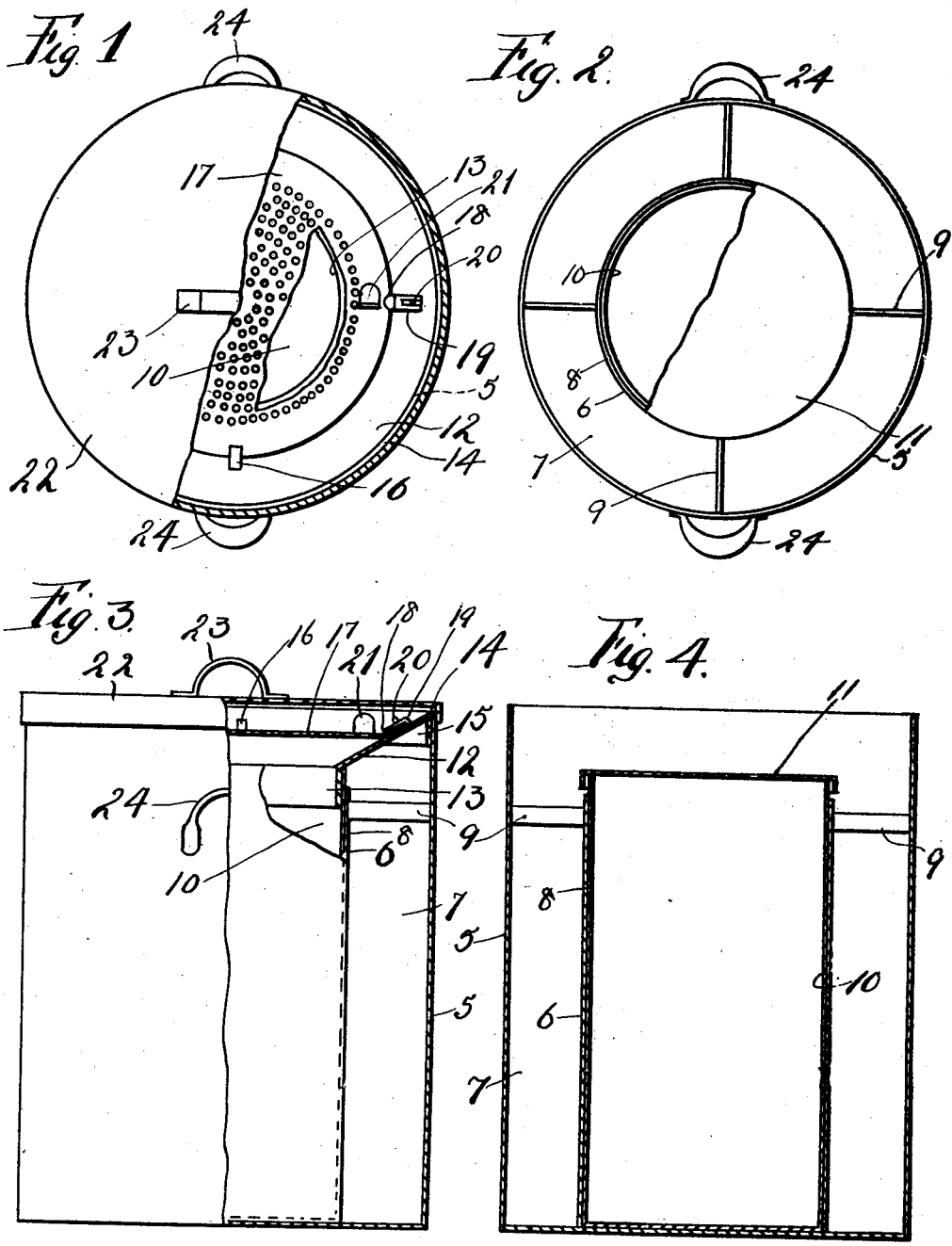

Patented Nov. 10, 1931

1,831,527

UNITED STATES PATENT OFFICE

MATHEW DOVIDAITIS, OF PHILADELPHIA, PENNSYLVANIA

CREAM RECEPTACLE

Application filed May 28, 1929. Serial No. 366,619.

My invention relates to new and useful improvements in a cream receptacle and one of its objects is to provide a receptacle into which cream is poured after being returned from the dining room to the pantry or kitchen so as to keep it in a fresh and sanitary condition for future use.

Devices of this kind are especially adapted for use in restaurants or public dining rooms where cream is placed upon the tables in open pitchers so that crumbs of bread, small vegetables, or pieces of vegetables may be accidentally dropped therein and when the cream is returned to the kitchen or pantry, it is desirable to save the same and remove the foreign material therefrom. By the use of a device of the kind herein described, the cream is poured upon a suitable screen which will retain the foreign material while permitting said cream to pass on through into a can which is removably mounted in a container for ice so that as long as the can remains in the container, the cream will be kept in a cool, fresh and sanitary condition and after the can has been filled, it may be removed and placed in a refrigerator or ice chest and the filled can replaced by another so that the can is always in position for the reception of cream brought in by the waiters.

Another object of the invention is to provide a cream receptacle consisting of an outside container having a circular partition therein to produce an ice compartment and a can compartment, said partition being suitably held at its upper end by braces, a can removably mounted in the can compartment and having a cover which will close the upper end of the can or its compartment, a funnel, a screen detachably connected with the funnel, and a top to enclose the complete receptacle.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is an upper end or top plan view of a cream receptacle embodying my invention, a portion of the top or cover being broken away to show the screen, funnel and other elements and a portion of said screen being broken away to more plainly illustrate the arrangement of the funnel.

Fig. 2 is a similar view with the funnel, screen and top cover removed and with the can cover in place and broken away to show the relation of the can to the partition.

Fig. 3 is a side elevation of the device with the parts in place as shown in Fig. 1, a portion of the outer container, partition and can being broken away and the funnel and screen being shown in section.

Fig. 4 is a longitudinal sectional view of the device including the parts shown in Fig. 2.

In carrying out my invention as herein embodied, 5 represents the outer container having side walls and a bottom, but normally open at the top or upper end and within this container is located a partition 6 suitably spaced from the side walls of the outer container so as to produce an ice compartment 7 and a can compartment 8.

The bottom of this partition is suitably fastened to the bottom wall of the outer container while the upper end is held in place by suitable braces 9 having their ends fixed to the outer container and said partition and as will be obvious by reference to Figs. 3 and 4, the upper end of said partition terminates short of the upper end of the outer container and said upper end is normally open for access to the can compartment.

It being understood that the ice compartment 7 is to be filled with ice or other cooling medium, the can compartment will be maintained at a low temperature and in said can compartment is removably mounted the inner container or can 10 which holds cream so as to keep it in a fresh and sanitary condition.

When the ice is being placed in its compartment, the can 10 may be removed and a suitable cover 11 placed over the top of the partition to prevent any of said ice entering the can compartment, but when the can is in said compartment, the cover 11 may be placed directly on said can so that no ice will enter the latter.

After the ice has been placed in its compartment, and a can placed in the can compartment, the funnel 12 is positioned so that its neck 13 projects into the upper open end of the can 10 while the rim 14 rests on top of the outer container 5 with the flange 15 snugly fitting inside of said outer container. The tapered body portion of the funnel is provided with a number of clips 16 under which the edge of the strainer 17 is inserted, it being finally and temporarily fixed in place by a sliding catch 18 slidably mounted in a sheath 19 and provided with a finger piece 20 for sliding it back and forth.

The strainer is of any suitable foraminous material, the same preferably being stamped from a sheet of metal and having a hand hold 21 punched therefrom.

The funnel is so arranged that the ice compartment is completely closed in order to keep the ice from melting too fast and in order to better maintain the low temperature in the receptacle, a top or closure 22 is fitted over the upper open end of the outer container and said top is provided with a suitable handle 23 for the proper manipulation thereof.

In order to readily transport the receptacle from place to place, handles 24 may be provided on the sides thereof.

From the foregoing description, it will be obvious that when a receptacle of this kind is in use, any cream returned from a dining room may be poured into the funnel upon removal of the top or closure 22 and said cream will pass through the screen directly into the can 10. Should there be any foreign matter in the cream thus returned, it will be separated therefrom by the screen and may be discarded at any time desired by removal of said screen. The ice compartment being filled with a suitable cooling medium, the cream will be maintained in a fresh condition and since the top or closure 22 is in place except when the cream is being poured into the can, said cream will be kept in a sanitary condition. When the can has been filled to the desired extent, it may be removed and placed in a refrigerator or other suitable place of storage for future use.

Of course I do not wish to be limited to the exact details of construction as herein shown, as these may be varied within the limits of the appended claims without departing from the spirit of my invention.

Having thus fully described my invention, what I claim as new and useful is:—

1. A cream receptacle comprising an outer container open only at its upper end, a partition within said container and spaced from the side walls thereof to provide an ice compartment and a can compartment, a can removably mounted in said can compartment, a funnel resting upon the upper edge of the outer container and having a neck projecting into the can thereby closing the ice compartment, a strainer removably mounted across the funnel and a top or closure on the outer container and closing the upper open end of the can through the medium of the funnel.

2. The combination with an outer container open at its upper end, a partition within said container and spaced from the side walls thereof to provide an ice compartment and a can compartment, of a funnel resting upon the upper edge of the outer container and having a neck projecting into the can thereby acting as a closure for the upper end of the ice compartment and providing a large mouth for the can.

3. In a device of the kind described, an outer container open at its upper end, an imperforate partition within the container and secured to the bottom of the latter and spaced from the side walls of said container to provide ice and can compartments, a can removably mounted in the can compartment, and means coacting with the outer container and the can functioning as a closure for the upper end of the ice compartment, and a mouth for the can.

4. In a device of the kind described, an outer container open at its upper end, a cylindrical partition within said container fixed to the bottom of the latter and having its side wall spaced from the wall of said outer container, the upper end of said partition terminating short of the upper end of the outer container, a can insertible within the inner compartment formed by the partition with the upper end of said can projecting slightly above the upper end of the partition and a funnel having its neck telescoped into the upper end of the can and its rim resting upon the upper edge of the outer container.

In testimony whereof, I have hereunto affixed my signature.

MATHEW DOVIDAITIS.